US009591009B2

United States Patent
Craig et al.

(10) Patent No.: US 9,591,009 B2
(45) Date of Patent: Mar. 7, 2017

(54) AIR-BASED AND GROUND-BASED SECURITY INFORMATION AND EVENT MANAGEMENT SYSTEM

(71) Applicant: The Boeing Company, Huntington Beach, CA (US)

(72) Inventors: John A. Craig, Snohomish, WA (US); James E. Vasatka, Monroe, WA (US); Jadranka Mead, Renton, WA (US)

(73) Assignee: The Boeing Company, Chicago, IL (US)

( * ) Notice: Subject to any disclaimer, the term of this patent is extended or adjusted under 35 U.S.C. 154(b) by 19 days.

(21) Appl. No.: 14/819,857

(22) Filed: Aug. 6, 2015

(65) Prior Publication Data

US 2017/0041331 A1  Feb. 9, 2017

(51) Int. Cl.
*H04L 29/06* (2006.01)
*H04L 29/14* (2006.01)

(52) U.S. Cl.
CPC ...... *H04L 63/1416* (2013.01); *H04L 63/1425* (2013.01); *H04L 63/1433* (2013.01); *H04L 63/1441* (2013.01)

(58) Field of Classification Search
CPC ............. H04L 63/1408; H04L 63/1416; H04L 63/1425; H04L 63/1433; H04L 63/1441; G06F 21/55; G06F 21/554; G06F 21/56; G06F 21/566

See application file for complete search history.

(56) References Cited

U.S. PATENT DOCUMENTS

| | | | | |
|---|---|---|---|---|
| 8,811,616 B2* | 8/2014 | Cabos | ................... | H04L 9/0825 380/270 |
| 9,369,484 B1* | 6/2016 | Lacerte | ............... | H04L 63/1441 |
| 2003/0027550 A1* | 2/2003 | Rockwell | ........... | B64D 45/0015 455/410 |
| 2014/0013431 A1* | 1/2014 | Bush | ....................... | G06F 21/00 726/23 |
| 2014/0380485 A1* | 12/2014 | Ayyagari | ............ | H04L 63/1433 726/25 |
| 2016/0285907 A1* | 9/2016 | Nguyen | .............. | H04L 63/1433 |

* cited by examiner

*Primary Examiner* — Minh Dinh
(74) *Attorney, Agent, or Firm* — Smith Moore Leatherwood LLP (57) ABSTRACT

A system, method, and computer readable media for detecting and mitigating the effects of a cyber event on an aircraft's network including an air-based security module and a ground-based security module that monitor the aircraft's networks and detect cyber events. A collaboration module facilitates communications between the air-based security module and the ground-based security module, and also switches the communications between the modules to an alternate, secure channel when a cyber event is detected. A simulation module that is independent from, but functionally substantially equivalent to, the air-based security module simulates network events that are detected on board the aircraft while the aircraft is in flight. A cyber agent module mitigates the effect of a cyber event on the aircraft's network while the aircraft is in flight based on information from the simulation module that is communicated by the ground-based security module to the air-based security via the collaboration module.

8 Claims, 4 Drawing Sheets

AIR-BASED AND GROUND-BASED SECURITY INFORMATION AND EVENT MANAGEMENT SYSTEM

TECHNOLOGICAL FIELD

The present disclosure relates generally to security information and event management (SIEM) systems used in connection with aircraft and, in particular, to a collaborative air-based and ground-based system for protecting an aircraft from a cyber event while in flight.

BACKGROUND

The aviation industry largely depends on the reliable functioning of critical information technology infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections and computing systems. These cyber event mitigation efforts require detection and response both during and after the cyber event.

Prior art security systems, such as SIEM systems, are dedicated to ground-based systems that rely on the availability of ample bandwidth needed for the collection, detection, and sharing of event data. By virtue of being ground-based, such prior art SIEM systems have the benefit of being continuously monitored and updated with the latest malware and virus signatures. Also, ground personnel with cybersecurity expertise are readily available to intervene and troubleshoot the hardware as needed.

However, with the exception of viruses and malware using previously known digital signatures, none of the above-described cyber-attack mitigation functions are readily available for implementation using the aircraft's network and computing resources while an aircraft is in flight. One of the reasons is a lack of sufficient bandwidth while the aircraft is in flight. Another reason is the lack of current software updates and patches on the aircraft's computing systems because the process for obtaining regulatory approval for such software updates typically take about two years. Also, personnel with cybersecurity expertise who understand how to mitigate the attack's effects are typically not on-board while the aircraft is in flight. Consequently, even the simplest mitigation steps that could contain detected cyber events cannot be executed while the aircraft is in flight. Rather, the on-board network server that logs data about the aircraft's operations has to transmit the data to the ground-based system so that proper mitigation steps can be taken when the aircraft lands. Thus, aircraft networks, including its computing systems, are subject to much greater delays in detecting and responding to cyber events.

One prior art attempt at addressing the issue of mid-flight cyber events involves the use of remote SIEM systems wherein the system being monitored is physically remote from the SIEM system itself, such as the Managed Security Services Provider (MSSP) model. However, the following limitations of remote SIEM systems make them unfeasible for use in an in-flight setting: lack of high-bandwidth communications capabilities at all times; lack of multiple alternative communications paths to achieve connectivity; lack of personnel expertise where mitigation/response needs to happen; and lack of capability (due to certification issues required by regulatory bodies) to troubleshoot systems while in flight.

Table 1 shown below illuminates the deficiencies when prior art ground-based SIEM systems (including remote systems) are unable to properly protect an aircraft while in flight, as correlated with the National Institute of Standards and Technology (NIST) cyber security framework references.

TABLE 1

| Function | Prior Art Ground-Based SIEM Systems | On-Board Functionality while the Aircraft is In-Flight | NIST Cyber Security Framework Reference |
|---|---|---|---|
| Access to High data rate communications enables Continuous Monitoring | Yes | No | DE.CM-7 |
| Identification of Cybersecurity events | In real time | Not possible on-board* | DE.CM-4, DE.CM-5, DE.CM-6, DE.CM-7 |
| Event Detection information is communicated to appropriate parties, events are reported and voluntary information sharing occurs with external stakeholders to archive broader cybersecurity awareness | In real time | Not possible in all situations (depends on connectivity) | DE.DP-4, RS.CO-1, RS.CO-3, RS.CO-4 |
| Immediately Accessible High-data rate communications enables real-time troubleshooting (analysis) | Yes | No | RS.AN-1 |
| Immediately Accessible High-data rate communications and data center data storage capabilities enables real-time updates to events and anomaly databases for subsequent help with troubleshooting | Yes | No | RS.CO-5 |
| Expertise is available virtually (non-collocated, but connected via high-speed links) or at point of attack, to ensure adequate response and support recovery | Yes | No | RS.AN-1, 2, 3, 4 |
| Immediately Accessible High-data rate communications enables mitigation to be | Yes | No | RS.RP-1, RS.MI-1, |

TABLE 1-continued

| Function | Prior Art Ground-Based SIEM Systems | On-Board Functionality while the Aircraft is In-Flight | NIST Cyber Security Framework Reference |
|---|---|---|---|
| done remotely or else is done on-site to prevent expansion of an event, mitigate its effects and eradicate the incident | | | RS.MI-2, RC.RP-1 |

*Other than for previously loaded malware signatures

Thus, it is desirable to have an effective system for mitigating the effects of cyber events on an aircraft while in flight.

BRIEF SUMMARY

In view of the foregoing background, example implementations of the present disclosure provide a system, method, and software for detecting and mitigating the effects of a cyber event on an aircraft's network. The system includes an air-based security information and management module that monitors the aircraft's networks and detects cyber events, a ground-based security information and management module that monitors the aircraft's networks and detects cyber events, and a collaboration module that facilitates communications between the air-based security information and management module and the ground-based security information and management module. The collaboration module dynamically switches the communications to an alternate, secure channel when a cyber event is detected. The system further includes a simulation module that is independent from, but functionally substantially equivalent to, the air-based security information and management module, and simulates network events that are detected on board the aircraft while the aircraft is in flight. The system includes a cyber agent module that mitigates the effect of a cyber event on the aircraft's network while the aircraft is in flight based on information from the simulation module that is communicated by the ground-based security information and management module to the air-based security information and management module via the collaboration module.

The air-based security information and management module and the ground-based security information and management module assess the aircraft's cyber network health at predetermined intervals and determine when the cyber network health is out of range with predefined parameters. The collaboration module dynamically switches the communications between the air-based security information and management module and the ground-based security information and management module to an alternate, secure channel by establishing priority over other network traffic and implementing encryption changes in the communications. The air-based security information and management module and ground-based security information and management module communicate via out-of-band traffic flows to share information about the aircraft's cyber network health. The air-based security information and management module synchronizes with the simulation module at predetermined intervals. The cyber agent module mitigates the effect of a cyber event on the aircraft's network while the aircraft is in flight based on information from the simulation module that is communicated by the ground-based security information and management module via an operator to the air-based security information and management module.

A method for detecting and mitigating the effects of a cyber event on an aircraft's network includes the steps of monitoring the aircraft's networks and detecting cyber events via an air-based security information and management module, monitoring the aircraft's networks and detecting cyber events via a ground-based security information and management module, facilitating communications between the air-based security information and management module and the ground-based security information and management module by dynamically switching the communications to an alternate, secure channel when a cyber event is detected, simulating network events that are detected on board the aircraft while the aircraft is in flight via a simulation module that is independent from, but functionally substantially equivalent to, the air-based security information and management module, and mitigating the effect of a cyber event on the aircraft's network while the aircraft is in flight based on information from the simulation module that is communicated by the ground-based security information and management module to the air-based security information and management module.

A computer-readable storage medium for detecting and mitigating the effects of a cyber event on an aircraft's network causes a computer system to at least monitor the aircraft's networks and detect cyber events with an air-based security information and management module, monitor the aircraft's networks and detect cyber events with a ground-based security information and management module, facilitate communications between the air-based security information and management module and the ground-based security information and management module by dynamically switching the communications to an alternate, secure channel when a cyber event is detected, simulate network events that are detected on board the aircraft while the aircraft is in flight with a simulation module that is independent from, but functionally substantially equivalent to, the air-based security information and management module, and mitigate the effect of a cyber event on the aircraft's network while the aircraft is in flight based on information from the simulation module that is communicated by the ground-based security information and management module to the air-based security information and management module The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

Figure 1:
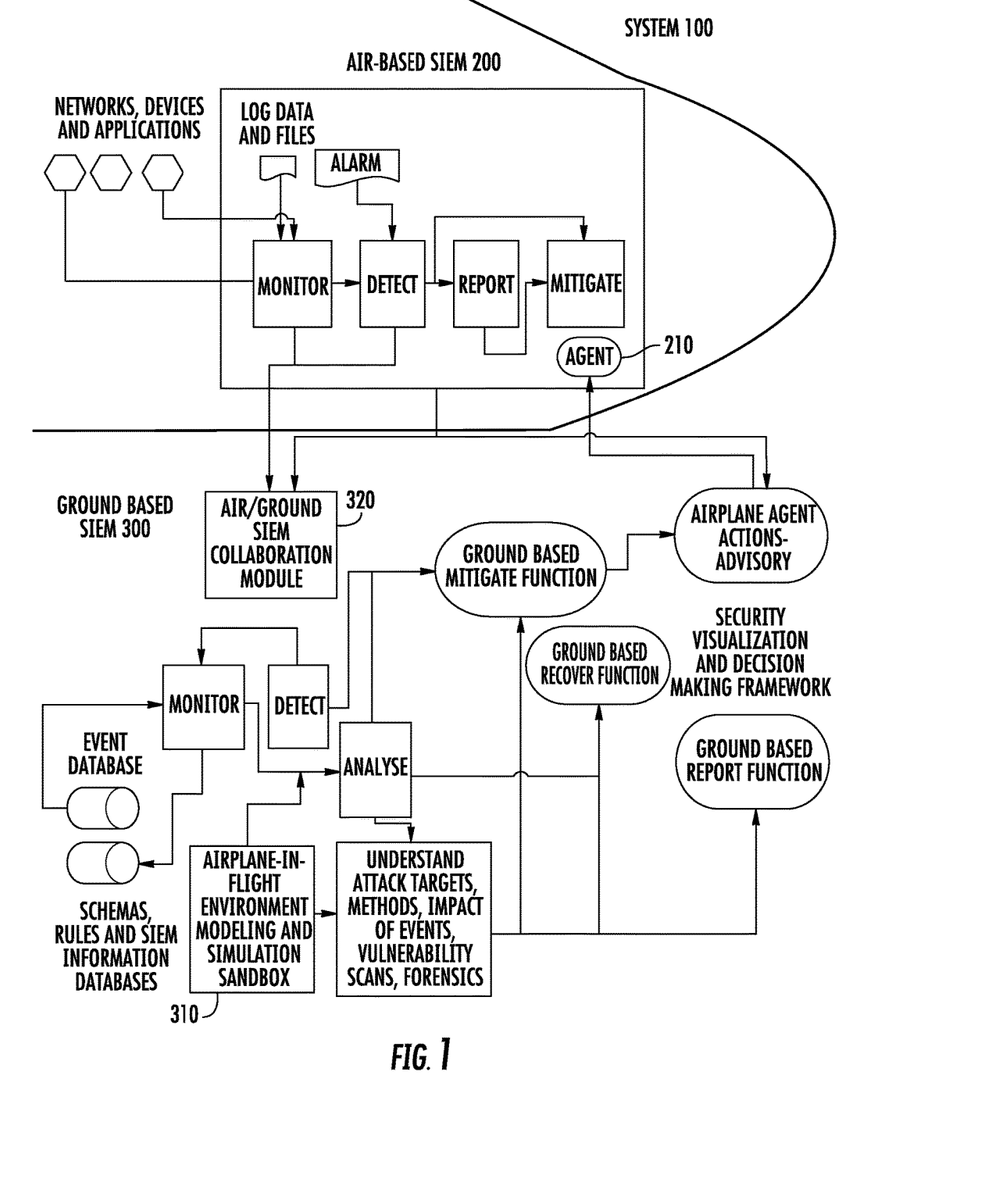
FIG. 1 is a block diagram of the collaborative air-based and ground-based security system in accordance with an example implementation of the present disclosure.

According the example implementations of the present disclosure, and as shown in FIG. 1, a collaborative air-based and ground-based SIEM system 100 is provided to detect and mitigate the effects of cyber events while an aircraft is in flight. As used herein, the term "cyber event" pertains to any malicious or suspicious event that compromises, or attempts to compromise, the operation of an aircraft's network, including its data connections and computing systems. Such mitigation includes detection of, and providing responses to, cyber events to lessen any impact on the aircraft's safety of travel. The collaborative system 100 partitions the architecture of a prior art ground-based system into two functionally and physically separate modules, which are the air-based module 200 and the ground-based module 300. The two SIEM modules 200, 300 are configured to have coordinated, and in some instances overlapping, functionality so they can provide each other with a complete picture of the aircraft's cyber security status with regards to NIST cyber security framework references. Such collaboration between the modules 200, 300 is controlled by a collaboration module 320.

Figure 2:
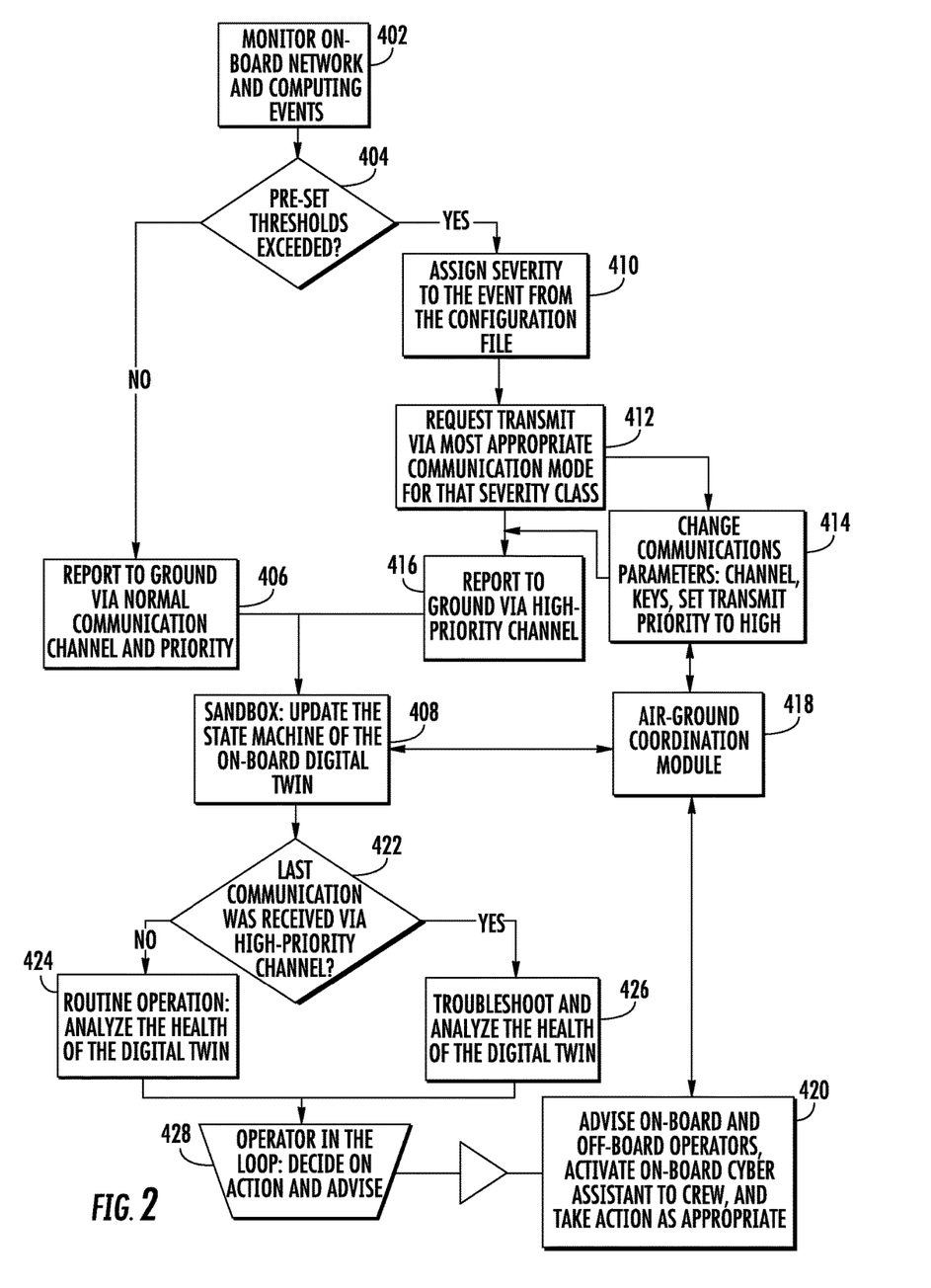
FIG. 2 is a flowchart illustrating operation of a collaborative air-based and ground-based security system in accordance with an example implementation of the present disclosure.

Referring now to FIGS. 1 and 2, when the system 100 is in operation, the air-based module 200 and ground-based module 300 monitor computing events on the aircraft's on-board network server and communicate information with one another about the cyber security status of the aircraft at regular intervals (step 402). The air-based module 200 and ground-based module 300 also compare the aircraft's cyber security health status to predefined thresholds or operational profiles (step 404). If the aircraft's cyber health is in line with the predefined thresholds or operational profiles, the air-based module 200 continues communicating with the ground-based module 300 via normal communications channels with normal priority (step 406). If the aircraft's cyber health exceeds the predefined thresholds or operational profiles (step 404), the system 100 assigns a severity level to the event (step 410) and the air-based module 200 requests to transmit data to the ground-based module 300 using the most appropriate communication mode for that severity class (step 412). For example, the air-based module 200 is configured to switch to an alternate, secure collaboration mode with a high priority level (steps 414 and 416). Specifically, the air-based module 200 and ground-based module 300 may include policies and algorithms that allow for dynamic change in communications and encryption. According to one example implementation, the air-based module 300 is integrated with the aircraft's on-board network server by modifying traffic quality of service and policy at the on-board network server to gain priority over other traffic when needed. According to another example implementation, the air-based module 200 integrates with the aircraft's on-board network server by changing the encryption method and keys on-the-fly to prevent disclosure of the aircraft's cyber status to an adversary who might be executing the cyber event. Additionally, both the air-based module 200 and ground-based module 300 have the capability to communicate via out-of-band traffic flows to share sensitive cyber security information about the aircraft.

As referenced above, the air-based module 200 synchronizes its cyber security data with a simulation module 310 at regular intervals (step 408), even in the case when the communication channel and priority level have changed (steps 414 and 416). The simulation module 310 is sandboxed and off-line apart from being in a receive mode as it awaits communications from the air-based module 200 that prompt the simulation module 310 to simulate events that are observed on-board which are not in-line with the expected behavior. Specifically, if the last communication from the air-based module 200 was received via a normal (not high-priority) channel (step 422), it is deemed to be a routine operation (step 424). However, if the last communication was received via a high-priority channel (step 422), the system 100 deems that the aircraft's network needs troubleshooting and additional analysis (step 426).

Based on the outcome from the simulation module 310, the ground-based module 300 (via an operator (step 418) or not) issues commands to an on-board cyber assistant module 210 via the collaboration module 320 (steps 418 and 420). The cyber assistant module 210 facilitates mitigation techniques on-board the aircraft in a manner that may be executed by the on-board crew. Thus, the cyber-assistant module 210 is able to mitigate cyber the effects of events in progress, prevent the expansion of a cyber event already in progress, and possibly eradicate the cyber event, all while the aircraft is in flight. In prior art systems, such actions would not have been possible until the aircraft landed. The present invention, therefore, significantly improves the cyber event detection and response time by enabling the mitigation techniques while in flight to the full extent allowed by certification, and in a secure manner.

According to example implementations of the present disclosure, the various components of the system 100 may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system 100 and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system 100 of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the backend system 102. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 3:
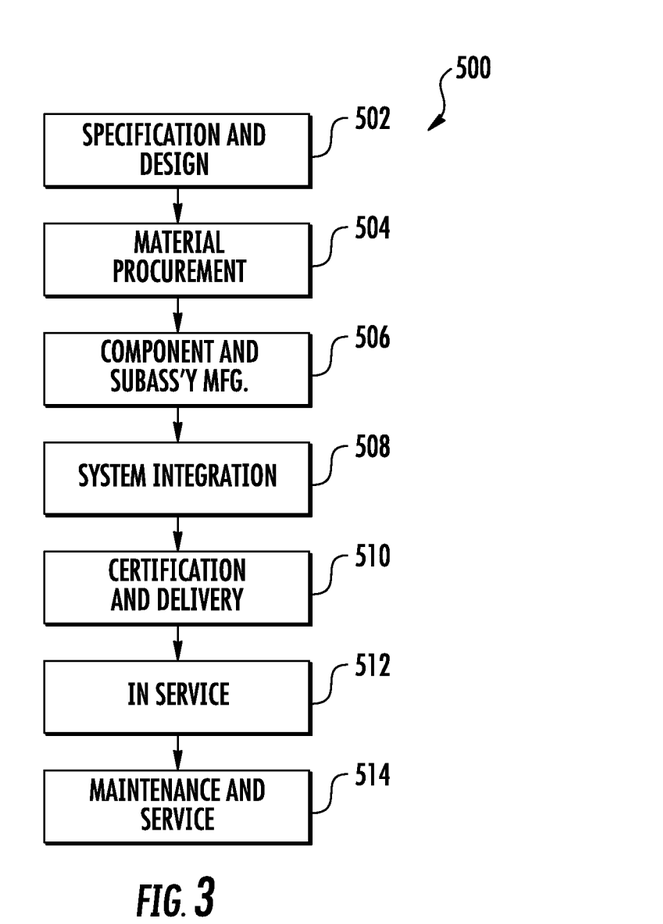
FIG. 3 is a block diagram of aircraft production and service methodology.
Figure 4:
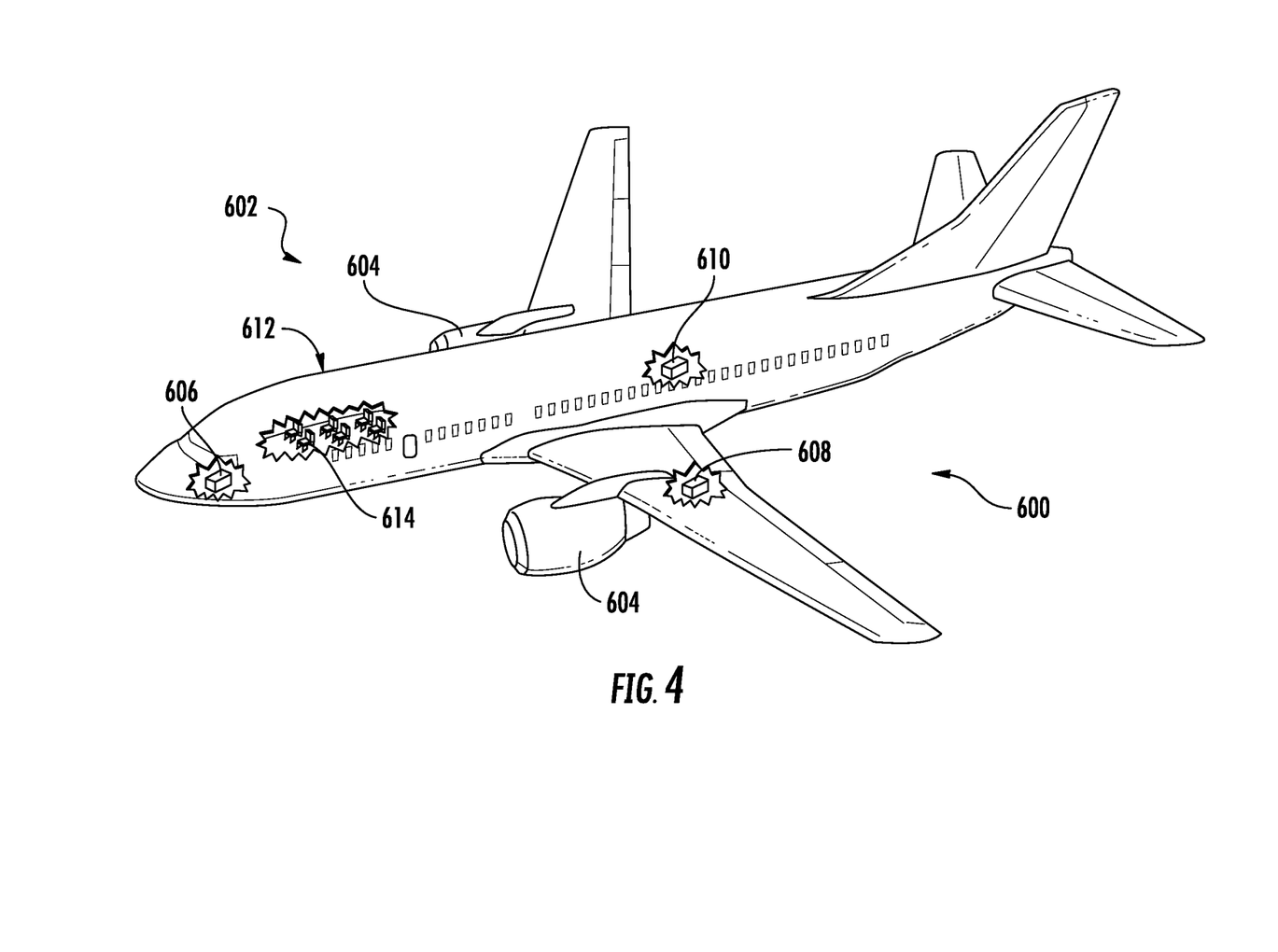
FIG. 4 is a schematic illustration of an aircraft.

As referenced above, examples of the present disclosure may be described in the context of aircraft manufacturing and service. As shown in FIGS. 3 and 4, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Example 1

As discussed above, prior art systems incorporate the use of only a ground-based SIEM which has inherent limitations on use while the aircraft is in flight. Accordingly, such prior art systems do not satisfy a number of the NIST cyber security framework references, as shown in Table 1 above. The invention as described in the present disclosure, on the other hand, is a collaborative system including both a ground-based SIEM and an air-based SIEM, which enables the collaborative system to satisfy NIST cyber security framework references that cannot be satisfied with only a ground-based module. In this example, the distribution of functions between the ground-based SIEM and air-based SIEM are graphically displayed relative to the NIST areas and functions. Also shown are the functionalities of the on-board cyber assist module and the alternative on-board communications capability relative to the NIST areas and functions.

| | | | Distributed Air-Ground SIEM - Functional Allocation of NIST Functions at Granular Level | | | |
| --- | --- | --- | --- | --- | --- | --- |
| NIST Area | Capability | Function | Ground-Based SIEM Module 300 | Air-Based SIEM Module 200 | On-board Cyber Assist Module 210 | Alternative on-board communications capability |
| DETECT (DE) | Anomalies and Events (DE.AE): Anomalous activity is detected in a timely manner and the potential impact of events is understood | DE.AE-1: A baseline of network operations and expected data flows for users and systems is established and managed | x | x | | |
| | | DE.AE-2: Detected events are analyzed to understand attack targets and methods | x | | | |
| | | DE.AE-3: Event data are aggregated and | x | | On board | |

-continued

Distributed Air-Ground SIEM - Functional Allocation of NIST Functions at Granular Level

| NIST Area | Capability | Function | Ground-Based SIEM Module 300 | Air-Based SIEM Module 200 | On-board Cyber Assist Module 210 | Alternative on-board communications capability |
|---|---|---|---|---|---|---|
| | | correlated from multiple sources and sensors | | sensors only | | |
| | | DEAE4: Impact of events is determined | x | | | |
| | | DE.AE-5: Incident alert thresholds are established | x | x | | |
| | Security Continuous Monitoring (DE.CM) The information system and assets are monitored at discrete intervals to identify cybersecurity events and verify the effectiveness of protective measures | DE.CM-1: The network is monitored to detect potential cybersecurity events | x | On board networks only | | |
| | | DE.CM-2: The physical environment is monitored to detect potential cybersecurity events | x | x | | |
| | | DE.CM-3: Personnel activity is monitored to detect potential cybersecurity events | x | x | | |
| | | DE.CM-4: Malicious code is detected | x | Preloaded signatures only | | |
| | | DE.CM-5: Unauthorized mobile code is detected | x | Preloaded signatures only | | |
| | | DE.CM-6: External service provider activity is monitored to detect potential cybersecurity events | x | | | |
| | | DE.CM-7: Monitoring for unauthorized personnel, connections, devices, and software is performed | x | On board only | | |
| | | DE.CM-8: Vulnerability scans are performed | x | | | |
| | Detection Processes (DE.DP): Detection processes and procedures are maintained and tested to ensure timely and adequate awareness of anomalous events. | DE.DP-1: Roles and responsibilities for detection are well defined to ensure accountability | x | x | | |
| | | DE.DP-2: Detection activities comply with all applicable requirements | x | x | | |
| | | DE.DP-3: Detection processes are tested | x | x | | |
| | | DE.DP-4: Event detection information is communicated to appropriate parties | x | If off board communications allow | | x |
| | | DE.DP-5: Detection processes are continuously improved | x | With the exception of Real-time events | | |
| RESPOND | (Response Planning (RS.RP):Response processes and procedures are executed and maintained, to ensure timely response to detected cybersecurity events. | RS.RP-1: Response plan is executed during or after an event | x | | x | x |
| | Communications (RS.CO): Response activities are coordinated with internal and external | RS.CO-1:Personnel know their roles and order of operations when a response is needed | | | x | |

| NIST Area | Capability | Function | Ground-Based SIEM Module 300 | Air-Based SIEM Module 200 | On-board Cyber Assist Module 210 | Alternative on-board communications capability |
|---|---|---|---|---|---|---|
| | stakeholders, as appropriate, to include external support from law enforcement agencies. | RS.CO-2: Events are reported consistent with established criteria | x | x | x | x |
| | | RS.CO-3: Information is shared consistent with response plans | x | x | x | x |
| | | RS.CO-4: Coordination with stakeholders occurs consistent with response plans | x | | x | x |
| | | RS.CO-5: Voluntary information sharing occurs with external stakeholders to achieve broader cybersecurity situational awareness | x | x | x | x |
| | Analysis (RS.AN): Analysis is conducted to ensure adequate response and support recovery activities. | RS.AN-1: Notifications from detection systems are investigated | x | x | | x |
| | | RS.AN-2: The impact of the incident is understood | x | | | |
| | | RS.AN-3: Forensics are performed | x | | | |
| | | RS.AN-4: Incidents are categorized consistent with response plans | x | x | x | x |
| | Mitigation (RS.MI): Activities are performed to prevent expansion of an event, mitigate its effects, and eradicate the incident. | RS.MI-1: Incidents are contained | x | If preprogrammed response rules allow | If preprogrammed response rules allow | |
| | | RS.MI-2: Incidents are mitigated | x | If preprogrammed response rules allow | If preprogrammed response rules allow | x |
| | | RS.MI-3: Newly identified vulnerabilities are mitigated or documented as accepted risks | x | | | |
| | Improvements (RS.IM): Organizational response activities are improved by incorporating lessons learned from current and previous detection/response activities | RS.IM-1: Response plans incorporate lessons learned | x | | | |
| | | RS.IM-2: Response strategies are updated | x | | | |
| RECOVER (RC) | Recovery Planning (RC.RP): Recovery processes and procedures are executed and maintained to ensure timely restoration of systems or assets affected by cybersecurity events. | RC.RP-1: Recovery plan is executed during or after an event | x | If pre-programmed recovery rules allow | If preprogrammed recovery rules allow | x |
| | Improvements (RC.IM): Recovery planning and processes are improved by incorporating lessons learned into future activities, | RC.IM-1: Recovery plans incorporate lessons learned | x | | | |
| | | RC.IM-2: Recovery strategies are updated | x | | | |
| | Communications (RC.CO): Restoration activities are coordinated with internal and external parties, such as coordinating centers, Internet Service | RC.CO-1: Public relations are managed | x | | | |
| | | RC.CO-2: Reputation after an event is repaired | x | | | |
| | | RC.CO-3: Recovery activities are communicated to internal stakeholders | x | If preprogrammed recovery rules allow | If preprogrammed recovery rules allow | |

| Distributed Air-Ground SIEM - Functional Allocation of NIST Functions at Granular Level | | | | | | |
|---|---|---|---|---|---|---|
| NIST Area | Capability | Function | Ground-Based SIEM Module 300 | Air-Based SIEM Module 200 | On-board Cyber Assist Module 210 | Alternative on-board communications capability |
| | Providers, owners of attacking systems, victims, other CSIRTs, and vendors. | and executive and management teams | | | | |

What is claimed is:

1. A system for detecting and mitigating the effects of a cyber event on an aircraft's network comprising:
  an air-based security information and management module that monitors the aircraft's networks and detects cyber events;
  a ground-based security information and management module that monitors the aircraft's networks and detects cyber events;
  a collaboration module that facilitates communications between the air-based security information and management module and the ground-based security information and management module, the collaboration module dynamically switching the communications to an alternate, secure channel when a cyber event is detected;
  a simulation module that is independent from, but functionally substantially equivalent to, the air-based security information and management module, and simulates network events that are detected on board the aircraft while the aircraft is in flight; and
  a cyber agent module that mitigates the effect of a cyber event on the aircraft's network while the aircraft is in flight based on information from the simulation module that is communicated by the ground-based security information and management module to the air-based security information and management module via the collaboration module.

2. The system of claim 1 wherein the air-based security information and management module and the ground-based security information and management module assess the aircraft's cyber network health at predetermined intervals and determine when the cyber network health is out of range with predefined parameters.

3. The system of claim 1 wherein the collaboration module dynamically switches the communications between the air-based security information and management module and the ground-based security information and management module to an alternate, secure channel by establishing priority over other network traffic and implementing encryption changes in the communications.

4. The system of claim 1 wherein the air-based security information and management module and ground-based security information and management module communicate via out-of-band traffic flows to share information about the aircraft's cyber network health.

5. The system of claim 1 wherein the air-based security information and management module synchronizes with the simulation module at predetermined intervals.

6. The system of claim 1 wherein the cyber agent module mitigates the effect of a cyber event on the aircraft's network while the aircraft is in flight based on information from the simulation module that is communicated by the ground-based security information and management module via an operator to the air-based security information and management module.

7. A method for detecting and mitigating the effects of a cyber event on an aircraft's network comprising the steps of:
  monitoring the aircraft's networks and detecting cyber events via an air-based security information and management module;
  monitoring the aircraft's networks and detecting cyber events via a ground-based security information and management module;
  facilitating communications between the air-based security information and management module and the ground-based security information and management module by dynamically switching the communications to an alternate, secure channel when a cyber event is detected;
  simulating network events that are detected on board the aircraft while the aircraft is in flight via a simulation module that is independent from, but functionally substantially equivalent to, the air-based security information and management module; and
  mitigating the effect of a cyber event on the aircraft's network while the aircraft is in flight based on information from the simulation module that is communicated by the ground-based security information and management module to the air-based security information and management module.

8. A computer-readable storage medium for detecting and mitigating the effects of a cyber event on an aircraft's network, the computer-readable storage medium being non-transitory and having computer readable program code portions stored therein that, in response to execution by one or more central processing units (CPUs) and or more additional CPUs, cause a computer system to at least:
  monitor the aircraft's networks and detect cyber events with an air-based security information and management module;
  monitor the aircraft's networks and detect cyber events with a ground-based security information and management module;
  facilitate communications between the air-based security information and management module and the ground-based security information and management module by dynamically switching the communications to an alternate, secure channel when a cyber event is detected;
  simulate network events that are detected on board the aircraft while the aircraft is in flight with a simulation module that is independent from, but functionally substantially equivalent to, the air-based security information and management module; and
  mitigate the effect of a cyber event on the aircraft's network while the aircraft is in flight based on information from the simulation module that is communicated by the ground-based security information and management module to the air-based security information and management module.

* * * * *